United States Patent [19]

Murbach et al.

[11] 4,076,772

[45] Feb. 28, 1978

[54] LARGE, NONPLANAR POLY(METHYL METHACRYLATE) PRE-HOLOGRAPHIC ELEMENT

[75] Inventors: Warren J. Murbach, China Lake; Arnold Adicoff, Ridgecrest, both of Calif.

[73] Assignee: The United States of America as represented by the Secretary of the Navy, Washington, D.C.

[21] Appl. No.: 671,902

[22] Filed: Mar. 29, 1976

[51] Int. Cl.$^2$ .................. B05D 1/38; B05D 5/06; B05D 7/04; G02B 5/32
[52] U.S. Cl. .................................. 264/2; 264/22; 264/134; 427/53; 427/163; 427/339
[58] Field of Search ............... 427/53, 339, 375, 414, 427/163; 428/475, 510; 264/134, 320, 339, 2, 22

[56] References Cited

U.S. PATENT DOCUMENTS 3,928,108  12/1975  Adicoff et al. .................. 427/339 X Primary Examiner—James R. Hoffman
Attorney, Agent, or Firm—R. S. Sciascia; Roy Miller; Lloyd E. K. Pohl

[57] ABSTRACT

A method for manufacturing large, nonplanar, transparent, gelatin-coated polymer sheets is disclosed. These sheets when sensitized, exposed, and developed can record and display holograms. A poly(methyl methacrylate) sheet is coated with nitrocellulose, the nitrocellulose is denitrated, and a gelatin solution is applied, then hardened. The sheet with its gelatin film is then thermally formed to any desired three-dimensional configuration.

6 Claims, No Drawings

LARGE, NONPLANAR POLY(METHYL METHACRYLATE) PRE-HOLOGRAPHIC ELEMENT

BACKGROUND OF THE INVENTION

This invention relates to holography, to elements for holographic recording and display, and more particularly to the manufacture of large, nonplanar elements, termed "pre-holographic" in that they are easily treated with a sensitizing solution to allow them to record and display volume phase holograms.

Recording of holograms in the form of a three-dimensional phase grating or relief pattern in an optical-quality medium is well known. Coherent light is split into an object beam and a reference beam. The object beam is passed through the object image to be recorded and is deflected to intersect the reference beam at the surface of a photosensitive medium. A complex interference pattern is created, caused by a spatial variation in the index of refraction of the medium. When properly illuminated the hologram will display a visual image of the recorded object. Other imaging applications of the media are well known to those skilled in the art.

A typical recording medium comprises a transparent base coated with a photosensitive layer. It frequently takes the form of tape or microfilm with a base of, for example, poly(ethylene terephthalate) resin or acetate resin; numerous commercially available photoresist materials may be used on these bases to form the photosensitive layer.

Gelatin recording media are desirable as photosensitive layers because, inter alia, they produce a hologram with a high diffraction efficiency; however, to date, they have until recently been employed on only a limited number of bases, mainly glass, in holographic applications.

Photosensitive layers containing gelatin have been used in photography on a number of film bases or substrates. In the case of a hydrophobic substrate, it has been necessary to coat the substrate with one or more, sometimes as many as four, subbing layers in the form of a suitable colloid dissolved in organic solvents such as methanol, ethanol, acetone, n-butyl acetate, or appropriate mixtures of these and other solvents. The colloids include, for example, homo-, co-, and terpolymers of the alkyl acrylates, alkyl methacrylates, unsaturated polyesters, and chlorosulfonated poly(ethylene).

Regenerated cellulose has been used as a subbing layer for gelatin on cellulose acetate film bases. This was accomplished by a superficial saponification of the cellulose ester. Poly(methyl methacrylate) is extremely resistant to mild saponification.

Poly(methyl methacrylate) sheet, more commonly referred to as PLEXIGLAS, a trademark of the Rohm and Haas Co., has good optical properties but has not, until recently, been used with gelatin, either as a substrate in a photographic application or as a support in a holographic application. Poly(methyl methacrylate) is probably less attractive as a holographic base in microfilm applications because it is less flexible and more brittle in thin sheets than many other polymers. It is also highly hydrophobic and, therefore, difficult to bond to gelatin.

It has recently been reported by the inventors, in U.S. Pat. No. 3,928,108, that a hardened but swollen and flexible film of gelatin may be attached to a curved piece of poly(methyl methacrylate) which has been subbed by a two-step operation in which the support is coated with nitrocellulose and the nitrocellulose is denitrated with an ammonium sulfide and ethanol solution. However, the hardened gelatin film is quite fragile and easily scratched and large films cannot readily be transferred to large poly(methyl methacrylate) supports.

SUMMARY OF THE INVENTION

The method herein disclosed permits the formation of large gelatin-poly(methyl methacrylate) pre-holographic elements. A large flat sheet of poly(methyl methacrylate) is coated with a solution of nitrocellulose and dried. It is then immersed in a denitrating solution, washed, and dried. A gelatin solution is wiped across the coated support, dried, and hardened. The gelatin-coated support is then placed on a mold or stand and heated in an oven. The support, being thermoplastic, will deform without loss of adhesion of the gelatin layer or loss of optical properties. A large, preholographic element having any desired shape is thus produced.

DESCRIPTION OF THE PREFERRED EMBODIMENT

Poly(methyl methacrylate) is an acrylic polymer with outstanding optical clarity and absence of color. It is a linear thermoplastic resistant to many aqueous inorganic reagents and, in contrast to the polyacrylates, highly resistant to alkaline saponification. It is available as PLEXIGLAS, Reg. Tr., in a number of formulations from Rohm and Haas Co. It should be understood in this specification to include sheets that are water-white and transparent, sheets which contain a variety of integrated dyes and pigments, and sheets which may be pre-shrunk or craze-resistant.

The references in the present specification to "large" elements is a relative term in comparison to present elements which are measured in terms of several inches or centimeters. Size is especially a factor in making curved elements since many common coating techniques cannot be employed.

In the preferred embodiment, a large sheet 16 × 15 × .25 inches (40.64 × 30.10 × .64 cm) is coated with a nitrocellulose solution prepared from 2 weight percent nitrocellulose and 98 weight percent 2-methoxyethanol. The nitrocellulose is preferably a high viscosity type made from purified cotton linters with a nitrogen content around 13% and a steel ball viscosity of 20 to 30 seconds.

The sheet is mounted on a flat, level surface and the coating is applied in a uniform thickness by means of a doctor blade set between 0.002 and 0.005 inch (0.0051–0.0127 cm). The coating is dried in a dust-free, dry atmosphere.

The coating is then denitrated by immersing it in a solution of ammonium sulfide in ethanol, each in 50 volume percent of the total. Denitration is allowed to proceed for 60 minutes, then the article (consisting at this point of the support and coating) is washed with distilled water and dried.

The denitrated nitrocellulose, commonly termed regenerated cellulose, is left as a thin, clear, hydrophilic film on the support, well suited as a subbing layer to poly(methyl methacrylate). It has been found, however, not to be effective with all polymer resins.

A gelatin solution is prepared by dissolving 4 grams of gelatin in 96 grams of distilled water at 50° C and .036 gram (0.9 wt %) of ammonium dichromate is added as a hardening agent; 0.7 to 0.9 weight percent of ammonium dichromate may be used. The solution is filtered, cooled to room temperature, and applied in a uniform layer to the coating. For convenience and due to the size of the article, a doctor blade set at 0.031 inch (0.0787 cm) was used. Since the gelatin is in solution, a number of coating techniques such as spraying or roll coating could be employed. A variety of gelatin thicknesses can be obtained by simply varying the amount of gelatin in the solution and/or varying the setting of the doctor blade. The gelatin coating is then dried in a dust-free environment. Since ammonium dichromate has been added, the gelatin will harden in 4 hours in ambient light. Alternatively, ultraviolet light may be employed for a shorter time, or, heat may be employed.

At this point the pre-holographic element can be formed to its desired shape. In the preferred embodiment an arcuate shape is desired, so a mold with a curved upper surface without irregularities was prepared. In accordance with well-known plastic forming techniques, the surface is covered with billiard felt or other soft cloth to prevent "mark off" or small scratches from dirt or irregularities on the mold. In this case, since the gelatin surface is desired to be inside the arc, the article is placed gelatin side down on the mold. The article is then heated in an oven to 125° C. The poly(methyl methacrylate) is thermoplastic and, becoming limp, it simply lays down over the mold.

The edges of the article should be held down as the article is slowly cooled. The temperature to be employed will vary with the thickness of the poly(methyl methacrylate) sheet. Generally, 110° C may be considered the minimum forming temperature and temperatures above 150° C should be avoided to prevent damage to the gelatin film. Optical clarity is maintained and the gelatin does not shrink or pull back.

Other forming methods can be used. "Free forming", in which the article is supported only at the edges and allowed to sink down, is one example; an air supply or vacuum may be employed. Curves through more than one plane can be obtained.

The pre-holographic element can be easily sensitized for use as a holographic optical element according to well known techniques. Such elements are commonly treated with an approximately 5% ammonium dichromate solution, exposed to radiation from an argon-ion laser, and developed.

A large screen display of the type obtained with the method herein described has a wide variety of applications, as, for example, holographic display devices or holographic optical elements. On pilot helmet visors, simultaneous head-up displays of a great many parameters are possible. The entire field of vision of the helmet is available to image targets for training purposes.

What is claimed is:

1. A method of manufacturing a pre-holographic element comprising the steps of:

Providing a flat poly(methyl methacrylate) support;

applying to said support a smooth coating of a solution comprising 2-methoxyethanol and nitrocellulose;

drying said coating;

denitrating said coating by completely immersing it in a stirred bath of denitrating solution comprising ammonium sulfide and ethanol;

washing said coating;

applying a uniform layer of a gelatin solution to said coating;

hardening said layer;

forming said element, comprising said support, coating, and layer, by partially supporting it in a dust-free environment at a temperature from 110° to 150° C for a time sufficient to cause said element to be bent about at least one axis.

2. The method of claim 1 wherein said coating is applied as a solution of 98 weight percent 2-methoxyethanol and 2 weight percent nitrocellulose.

3. The method of claim 1 wherein said coating is immersed for 60 minutes in a denitrating solution consisting of 50 volume percent ammonium sulfide and 50 volume percent absolute ethanol.

4. The method of claim 1 wherein said smooth coating and said uniform layer are applied by a doctor blade.

5. The method of claim 1 wherein said hardening is accomplished by including from 0.7 to 0.9 weight percent ammonia dichromate in said gelatin solution, then drying said uniform layer and exposing the uniform layer to light.

6. The method of claim 1 wherein said forming takes place with said element placed gelatin side down on a curved, cloth-covered mold.

* * * * *